United States Patent
Ihara et al.

(10) Patent No.: US 9,371,616 B2
(45) Date of Patent: Jun. 21, 2016

(54) LAMINATE AND PRODUCTION METHOD THEREOF

(75) Inventors: Kazuhito Ihara, Tokyo (JP); Yasumitsu Fujino, Tokyo (JP)

(73) Assignee: KONICA MINOLTA HOLDINGS, INC., Tokyo (JP)

( * ) Notice: Subject to any disclaimer, the term of this patent is extended or adjusted under 35 U.S.C. 154(b) by 1181 days.

(21) Appl. No.: 12/647,623

(22) Filed: Dec. 28, 2009

(65) Prior Publication Data

US 2010/0173146 A1  Jul. 8, 2010

(30) Foreign Application Priority Data

Jan. 5, 2009  (JP) .................................. 2009-000112
Jan. 27, 2009  (JP) .................................. 2009-015194
Mar. 25, 2009  (JP) .................................. 2009-073515

(51) Int. Cl.
*B32B 5/16* (2006.01)
*D21H 27/32* (2006.01)
*B01F 5/06* (2006.01)
*B29B 7/32* (2006.01)
(Continued)

(52) U.S. Cl.
CPC ................ *D21H 27/32* (2013.01); *B01F 5/068* (2013.01); *B01F 5/0663* (2013.01); *B29B 7/325* (2013.01); *B29B 7/92* (2013.01); *B32B 27/08* (2013.01); *B32B 27/20* (2013.01); *B32B 27/283* (2013.01); *B32B 27/30* (2013.01); *B32B 27/322* (2013.01); *B32B 27/34* (2013.01); *B32B 27/36* (2013.01); *B32B 27/365* (2013.01); *C08L 1/02* (2013.01); *C09D 101/02* (2013.01); *B32B 2262/062* (2013.01); *B32B 2262/065* (2013.01); *B32B 2262/067* (2013.01); *B32B 2264/10* (2013.01); *B32B 2264/102* (2013.01); *B32B 2307/306* (2013.01); *B32B 2307/7242* (2013.01); *B32B 2419/00* (2013.01); *B32B 2457/00* (2013.01); *B32B 2605/08* (2013.01); *Y10T 428/25* (2015.01); *Y10T 428/269* (2015.01)

(58) Field of Classification Search
USPC ..................................................... 428/331, 326
See application file for complete search history.

(56) References Cited

U.S. PATENT DOCUMENTS 6,091,874 A * 7/2000 Higashi et al. ................. 385/130
2005/0203257 A1 * 9/2005 Uchida et al. ................. 525/437
(Continued)

FOREIGN PATENT DOCUMENTS

JP  5092527  4/1993
JP  2002069208  3/2002
(Continued)

OTHER PUBLICATIONS

"Montmorillonite," 2001, Mineral Data Publishing (Handbook of Mineralogy), http://www.handbookofmineralogy.org/pdfs/montmorillonite.pdf.*
(Continued)

*Primary Examiner* — Nicholas Kokkinos
(74) *Attorney, Agent, or Firm* — Lucas & Mercanti, LLP (57) ABSTRACT

The laminate has a resin substrate and a composite layer thereon. The composite layer contains an inorganic compound and a cellulose fiber exhibiting an average fiber diameter of not less than 2 nm and not more than 200 nm. The laminate has a flexible substrate which exhibits superior gas-barrier capability as well as enhanced mechanical strength and heat-resistance and is suitably applicable to a variety of display substrates.

11 Claims, 1 Drawing Sheet

(51) Int. Cl.
*B29B 7/92* (2006.01)
*C08L 1/02* (2006.01)
*C09D 101/02* (2006.01)
*B32B 27/08* (2006.01)
*B32B 27/20* (2006.01)
*B32B 27/28* (2006.01)
*B32B 27/30* (2006.01)
*B32B 27/32* (2006.01)
*B32B 27/34* (2006.01)
*B32B 27/36* (2006.01)

(56) References Cited

U.S. PATENT DOCUMENTS

2006/0182941 A1* 8/2006 Yano et al. ............... 428/292.1
2008/0145641 A1* 6/2008 Li et al. ................... 428/313.9
2009/0002916 A1 1/2009 Wei et al.

FOREIGN PATENT DOCUMENTS

| | | |
|---|---|---|
| JP | 2005042283 | 2/2005 |
| JP | 200560680 | 3/2005 |
| JP | 2006188654 | 7/2006 |
| JP | 200751266 | 3/2007 |
| JP | 2008-001728 | 1/2008 |
| JP | 2008-209595 | 9/2008 |
| JP | 2008242154 | 10/2008 |
| JP | 2008-276164 | 11/2008 |
| JP | 2009197122 | 9/2009 |
| JP | 2010-168573 | 8/2010 |
| WO | 2007/088974 | 8/2007 |

OTHER PUBLICATIONS

Japanese Office Action, Patent Application No. 2009-000112.
English translation of Japanese Office Action, Patent Application No. 2009-000112.

* cited by examiner

LAMINATE AND PRODUCTION METHOD THEREOF

This application claims priority from Japanese Patent Application No. 2009-000112, filed on Jan. 5, 2009; No. 2009-015194, filed on Jan. 27, 2009; and No. 2009-073515, filed Mar. 25, 2009, which are incorporated hereinto by reference.

FIELD OF THE INVENTION

The present invention relates to a laminate comprising a layer containing a cellulose fiber having an average fiber diameter of 2 to 200 nm and an inorganic compound, and a production method thereof.

BACKGROUND OF THE INVENTION

Fiber-reinforced composite materials of which the strength or rigidity is markedly enhanced by incorporation of various fibrous reinforcing materials into a resin are broadly employed in the field of electric devices, electronics, machines, automobiles and construction material.

Fibrous reinforcing materials composed of organic materials such as a polyester fiber, a polyamide fiber or an aramid fiber have been studied but there were problems such that their reinforcing effects were not sufficient.

Meanwhile, high-functional materials employing materials derived from plants have been noted from the viewpoint of carbon neutral and there has been proposed a reinforced resin which is incorporated with a plant fiber, such as bamboo, kenaf, sugar cane, wood or the like, as described in, for example, Japanese Patent Application JP 5-92527A and JP 2002-69208. However, it was proved that such proposed composed material's were insufficient in dynamic characteristics such tensile elastic modulus or bending elastic modulus, so that their use was limited.

Further, there was proposed a fiber-reinforced material in which a micro-fibrilated cellulose fiber obtained by defibrating a plant fiber is incorporated in a resin and it was also reported that the use of such a micro-fibrilated cellulose fiber as a reinforcing material for resin results in markedly reduced linear expansion coefficient as well as enhanced mechanical strength, as described in, JP 2005-42283 and JP 2007-51266. For instance, JP 2005-42283 disclosed a method of dispersing a micro-fibrillated fiber in a resin in which a pulp was mixed with the resin and defibrated by using a biaxial kneader. However, it was proved that it was difficult to disperse a fiber homogeneously in the resin and an excessive shearing stress was applied to the fiber during kneading, resulting in cut micro-fibrils or destruction of crystallinity, leading to a reduced reinforcement effect and rendering it difficult to achieve sufficient dynamic strength. JP 2007-51266 disclosed a production method of a fiber composite material in which a fiber assembly was formed via a drying step from a micro-fibrillated cellulose fiber dispersion and the surface of the fiber assembly was optionally chemical-modified with the intention of achieving improved moisture absorption characteristic or securing sufficient heat resistance, followed by immersion in a polymerizable monomer to perform polymerization; however, it was proved that fibrillated fibers were re-aggregated and then molded, sometimes forming stripes in the state of being dispersed in a resin matrix. Thus, via these methods, it was difficult to achieve homogeneous dispersion of cellulose fibers as a reinforcing material in a resin matrix, rendering it difficult to achieve sufficient dynamic strength of the obtained fiber-reinforced material and limiting the application range thereof.

Recently, there has been studied application of such fiber-reinforced materials of a flexible substrate for display or a substrate for a solar cell. For instance, composite material sheet reinforced by incorporation of a cellulose fiber to a resin matrix was proposed in JP 2008-60680 or JP 2008-242154, which achieved linear expansion coefficient as low as a glass material and mechanical strength as high as a stainless steel material, but was insufficient in barrier capability for oxygen or moisture when applied to a display substrate or in flexibility when used as a flexible substrate. Further, JP 2006-188654 proposed a sheet provided with a layer containing an inorganic lamellar compound to achieve sufficient gas-barrier capability, but it was not sufficiently suitable for application to the foregoing flexible substrate in flexibility or strength, restricting the application range thereof.

SUMMARY OF THE INVENTION

In view of the foregoing problems, it is an object of the present invention to provide a flexible substrate which exhibits superior gas-barrier capability as well as enhanced mechanical strength and heat-resistance and is suitably applicable to a variety of display substrates and the like.

One aspect of the present invention is directed to a laminate comprising a resin substrate provided thereon with a composite layer, wherein the composite layer contains an inorganic compound and a cellulose fiber exhibiting an average fiber diameter of not less than 2 nm and not more than 200 nm.

Another aspect of the invention is directed to a production method of a resin composite material comprising a cellulose fiber dispersed in a matrix resin, wherein the method comprises subjecting a resin composition containing the cellulose fiber and the matrix resin to extensional flow mixing.

In the present invention, lamination of a composite resin layer containing micro-fibrillated cellulose fibers and an inorganic compound onto a resin substrate provided a flexible substrate which was superior in gas-barrier capability as well as mechanical strength and heat resistance and was also suitable for various display substrates.

DETAILED DESCRIPTION OF THE INVENTION

There will be described the embodiments of the invention but the present invention is not limited to these.

The present invention is directed to a resin substrate provided thereon with at least one layer containing a cellulose fiber exhibiting an average fiber diameter of 2 to 200 nm, an inorganic compound.

In the present invention, it was found that formation of one or more layers on a resin substrate which contain a cellulose fiber and an inorganic compound, and preferably a resin, enabled achieving improvements in gas barrier capability, as well as mechanical strength and heat resistance. Specifically, constitution as a reinforcing material was studied, while noting a cellulose fiber. Thus, a cellulose obtained from plant fibers such as pulp was defibrated in an aqueous medium to a range of 2-200 nm of an average fiber diameter; and laminating, onto a resin substrate, such cellulose fiber or fiber composite resin obtained by compounding the cellulose fibers into a resin, resulted in a resin substrate improved in mechanical strength, heat characteristic (e.g., heat resistance, linear expansion coefficient). Furthermore, it was found that laminating an inorganic compound layer or a resin layer containing an inorganic compound to form a multilayered laminate achieved markedly improved gas barrier capability, enabling to obtain a flexible substrate of high strength, high heat resistance and high gas barrier capability, whereby the present invention has come into being.

Constitution of Laminate

The laminate of the present invention features in that the laminate comprises a cellulose fiber exhibiting an average fiber diameter of not less than 2 nm and not more than 200 nm, an inorganic compound, and preferably, a resin, which are contained together in a single layer or separately in plural layers.

Accordingly, one or more layers containing one or more components of a cellulose fiber and an inorganic compound, and preferably, a resin may be formed on a resin substrate; and all of the foregoing components are contained together in a single layer or separately in plural layers formed on the resin substrate. Examples of such a layer configuration include:

(1) a configuration in which three layers of a layer containing a cellulose fiber, a layer containing an inorganic compound and preferably, a layer containing a resin, are each individually laminated on the resin substrate;
(2) a configuration in which a layer containing cellulose fibers and a resin, and a layer containing an inorganic compound are each individually laminated on the resin substrate;
(3) a configuration in which a layer containing an inorganic compound and a resin, and a layer containing cellulose fibers are each individually laminated on the resin substrate;
(4) a configuration in which a layer containing cellulose fibers and slayer containing an inorganic compound and a resin are each individually laminated on the resin substrate; and
(5) a configuration in which a cellulose fiber, an inorganic compound and a resin are contained in an single layer; but are not limited to these. These layers may be provided on one side or both sides of the resin substrate.

Of the foregoing configuration, the configuration of a layer containing cellulose fibers and a resin and a layer containing an inorganic compound being laminated on a resin substrate, and the configuration of a single layer containing all of cellulose fibers, an inorganic compound and a resin being laminated on the resin substrate are preferred for improvements of mechanical strength, heat resistance and gas barrier capability.

Cellulose Fiber

A cellulose fiber of the invention is one in which fibers are defibrated to a state of a micro-fibril. Preferably, the cellulose fiber is one which was chemically or physically surface-modified, or the surface of the cellulose fiber is one having been subjected to a chemical or physical modification treatment. Raw materials of cellulose fibers include, for example, a fiber separated from vegetables such as pulp, wood material, cotton, kenaf, hemp, jute, banana, coconuts, seaweed and the like; a fiber separated from animal fiber produced by seasquirt, a marine animal; and a bacteria cellulose produced by an acetobacter. Of these, a fiber separated from plant fiber is preferred and a fiber obtained from a plant fiber such as pulp, cotton or the like is more preferred. In the invention, these fibers are defibrated by a defibrating treatment to a minute microfibril-formed cellulose fibers by using a homogenizer or a grinder. Such a defibrating treatment is not specifically limited so long as its contained fibers maintain a fiber state.

Specifically, a cellulose fiber such as pulp is placed at an amount of 0.1-3.0% by mass into a water-containing vessel and subjected to a defibrating treatment by using a high-pressure homogenizer to obtain an aqueous dispersion of a cellulose fiber which is defibrated to microfibrils having an average fiber diameter of approximately 0.1 to 10.0 µm. Further, the thus obtained microfibril dispersion is repeatedly subjected to a grinding treatment to obtain cellulose fibers having an average fiber diameter of 2 to 500 nm. A grinder used in the foregoing grinding treatment include, for example, Pure Fine Mill (made by Kurita Seisakusho Co., Ltd.).

Alternatively, there is known the use of a high-pressure homogenizer, in which a cellulose fiber dispersion is ejected from each of paired nozzles at a high-pressure of approximately 250 MPa and the thus ejected streams are allowed to collide with each other to grind the cellulose fiber. Apparatuses used therein include, for example, "HOMOGENIZER" made by Sanwa Kikai Co., Ltd. and "ALTEMIZER SYSTEM" made by Sugino machine Co., Ltd.

The cellulose fiber obtained by a defibrating treatment is micro-fibrillated, forming a fiber hierarchical structure in the form of binding units of crystalline fibers (a 2-4 fiber diameter being a minimum unit) in which tens of cellulose molecular chains are bonded through hydrogen bond and also forming fibers with a fiber diameter at a micrometer level, depending on a defibrating degree.

The average fiber diameter of a cellulose fiber is preferably not less than 2 nm and not more than 200 nm, more preferably not less than 2 nm and not more than 100 nm, and still more preferably not less than 4 nm and not more than 40 nm. The average fiber diameter defined herein is an average value of the diameters of fibers dispersed in a resin, which is determined by image observation using a scanning electron microscope. An average cellulose fiber diameter of more than 200 nm results in insufficient strength of a fiber composite material. An average cellulose fiber diameter of less than 2 nm renders it difficult to obtain a cellulose fiber of the invention by the defibrating treatment or grinding treatment, as described above.

The length of a cellulose fiber is not specifically limited, but an average fiber length is preferably not less than 50 nm and more preferably not less than 100 nm. An average fiber length of less than 50 nm results in insufficient strength of a fiber composite material. The ratio of average fiber length to average fiber diameter (which is also called an aspect ratio) is preferably not less than 20 and not more than 10,000, and more preferably not less than 50 and not more than 7,000. A ratio of less than 20 results in insufficient strength of a fiber composite material and a ratio of more than 10,000 often causes aggregation of fibers, leading to insufficient strength of the fiber composite material.

In the invention, an average fiber diameter and an average fiber length were determined in the manner that obtained fibers were observed with a transmission electron microscope, H-1700FA (made by Hitachi Seisakusho Co., Ltd.) at a 10,000- to 100,000-fold magnification, 100 pieces of the fiber were randomly chosen from the obtained electronmicrograph and each of them was analyzed with respect to fiber diameter and fiber length by using a image processing software (WINROOF) to determine a simple number average value thereof.

In the invention, a cellulose fiber may be chemically or physically surface-modified to enhance affinity to a resin, thereby achieving enhancement in mechanical strength or heat resistance of a fiber composite layer. Examples of chemical modification include introduction of a functional group through acetylation, cyano-ethylation, acetal formation, ether formation or isocyanate formation; introduction of a hydrocarbon group via these functional groups; and compounding or coating a silane coupling agent having a functional group such as an amino group, a substituted amino group, an epoxy group, a glycidyl group or the like, or an inorganic titanium or aluminum substance through chemical reaction or the sol-gel method.

Chemical Modification of Cellulose

Surface modification of a cellulose fiber includes chemical modification and physical modification, and is preferably chemical modification. There will be detailed chemical modification. A cellulose fiber to be incorporated in a resin may preliminarily be chemical-modified with an appropriate modifier to improve affinity to the resin, leading to enhanced mechanical strength or heat resistance of a fiber composite material.

In the invention, a hydroxyl group of a cellulose fiber is chemically modified by using a modifying agent (or modifier) such as an acid, alcohols, a halogenating agent, an acid anhydride, isocyanates, and a silane-coupling agent. Chemical modification can be conducted according to the method known in the art. For instance, a defibrated cellulose fiber is added to water or a suitable solvent and dispersed, and then, a suitable chemical modifier is added thereto and allowed to react under optimum reaction conditions. In addition to a chemical modifier, there may be added a reaction catalyst, for example, a basic catalyst such as pyridine, N,N-dimethylpyridine, triethylamine, sodium methoxide, sodium ethoxide or sodium hydroxide; or an acidic catalyst such as acetic acid, sulfuric acid or perchloric acid. To prevent the reaction rate or the polymerization degree from being lowered, the use of a basic catalyst such, as pyridine is preferred. The reaction temperature is preferably 40 to 100° C. to inhibit alteration such as yellowing of the cellulose fiber or lowering of the polymerization degree. The reaction time may optimally be chosen according to a modifier to be used or the reaction condition.

Examples of a functional group to be introduced to a cellulose fiber in chemical modification include, an acetyl group, a methacryloyl group, a propanoyl group, a butanoyl group, an iso-butanoyl group, a pentanoyl group, a hexanoyl group, a heptanoyl group, an octanoyl group, a methyl group, an ethyl group, a propyl group, an iso-propyl group, a butyl group, an iso-butyl group, tert-butyl group, a pentyl group, a hexyl group, a heptyl group and an octyl group.

When introducing a reactive group, a silane coupling agent capable of introducing a reactive group may be used and examples thereof include a silane coupling agent containing a vinyl group at the end, such as vinylmethoxysilane, vinyltriethoxysilane, methacryloxypropyltrimethoxysilane, methacryloxypropyltriethoxysilane, methacryloxypropyldimethoxysilane; a silane coupling agent containing a epoxy group at the end, such as glycidoxypropyltriethoxysilane, glycidoxypropyltrimethoxysilane, glycidoxypropylmethyldimethoxysilane; a silane coupling agent containing a mercapto group at the end, such as mercaptopropyltrimethoxysilane or mercaptopropyltriethoxysilane; and of these, one containing an epoxy group or a vinyl group is preferred.

These functional groups may be introduced singly or in combination. Specifically, introduction of a functional group which is the same as or similar to a functional group contained in a resin, or a functional group which is reactive with a resin results in enhanced affinity to the resin or enables to form a covalent bond between a cellulose fiber and the resin, whereby uniform dispersibility can be secured and enhanced mechanical strength or heat resistance can also be achieved when dispersing a cellulose fiber in a matrix resin.

Inorganic Compound

In the following, there will be described an inorganic compound. The inorganic compounds of the invention include an inorganic particulate compound and an inorganic lamellar compound.

The inorganic compound of the invention is contained, in layer(s) provided on the resin substrate, as a compound in a lamellar form (which is hereinafter also denoted as an inorganic lamellar compound) or as a compound in a particulate form (which is also denoted as an inorganic particulate compound or simply as inorganic particles)

Inorganic Particulate Compound

Although a simple substance film of a fibrillated cellulose fiber enhances physical property, the present invention can achieve a further enhanced result in flow resistance by its use combined with a inorganic particulate compound which is harder than an organic material. Since a simple substance of such a inorganic particulate compound (which is hereinafter also denoted as inorganic particles) exhibits little expansion with temperature, inclusion of a inorganic particulate compound or inorganic particles in a cellulose fiber matrix can achieve further enhanced heat characteristics in heat resistance and linear expansion coefficient.

In the invention, an inorganic particulate compound or inorganic particles are preferably homogeneous oxide particles. The homogeneous oxide particles refer to particles having a homogeneous distribution of a single metal oxide within the particle. Specifically, such homogeneous oxide particles are particles of an oxide selected from silica of silicon oxide, titanium oxide, zinc oxide, aluminum oxide, zirconium oxide, hafnium oxide, niobium oxide, tantalum oxide, magnesium oxide, calcium oxide, strontium oxide, barium oxide, yttrium oxide, lanthanum oxide, cerium oxide, indium oxide, tin oxide and lead oxide.

Composite oxide particles in which a silicon oxide and at least one other metal oxide are homogeneously distributed within the particle may be used and specifically, are those composed of silica of silicon oxide and at least one of titanium oxide, zinc oxide, aluminum oxide, zirconium oxide, hafnium oxide, niobium oxide, tantalum oxide, magnesium oxide, calcium oxide, strontium oxide, barium oxide, yttrium oxide, lanthanum oxide, cerium oxide, indium oxide, tin oxide and lead oxide. Herein, the foregoing homogeneous oxide particles are those in which a silicon oxide (e.g., silica) and at least one of other metal oxides described above are homogeneously distributed within the particle without being localized and those which exhibit no distribution of refractive index within the particle.

The shape of such inorganic particles is not specifically limited but spherical particles are suitable. The particle size distribution is not specifically limited but to achieve further enhanced effects of the invention, particles of a relatively narrow distribution is more suitable than those of a broad distribution.

In the invention, inorganic particles are contained preferably in an amount of 5-70 parts by mass, and more preferably 5-50 parts by mass per 100 parts by mass of cellulose fiber.

The volume average particle size of inorganic particles is preferably not less than 1 nm and not more than 1000 nm, and more preferably not less than 2 nm and not more than 500 nm. Similarly to the manner described earlier, a volume average particle size was determined in the manner that particles were observed with a transmission electron microscope, for example, 1-1700HA (made by Hitachi Seisakusho Co., Ltd.)

at a 10,000- to 100.000-fold, and 100 particles were randomly chosen from the obtained electronmicrograph to determine a volume average particle size.

The inorganic particles of the invention include those in which a silica layer was formed on the surface of the homogeneous oxide particles and the silica layer was further subjected to a hydrophobilizing treatment.

Hydrophobilized inorganic particles or non-hydrophobilized particles are employed according to properties of a cellulose fiber forming a matrix.

Examples of a production method of homogeneous oxide particles include a pyrolysis method (which is a method of pyrolyzing a raw material to obtain fine particles, including a spray drying method, a flame spraying method, a plasma method, a gas phase reaction method, a freeze-drying method, a heated-kerosene method and heated-petroleum method), a precipitation method (co-precipitation method), a hydrolysis method (a salt solution method, an alkoxide method, a sol-gel method), a hydrothermal method (precipitation method, crystallization method, hydrothermolysis method, hydrothermal oxidation method). Of these methods, the pyrolysis method, precipitation method or hydrolysis method is preferred in terms of producing uniform small-sized oxide particles. Production of the homogeneous oxide particles may be performed by a combination of the foregoing methods.

Inorganic Lamellar Compound

Inorganic lamellar compounds are those having a structure in which crystalline structures of a 1-1.5 nm thick unit are layered, including a smectite group, a vermiculite group and a mica group. Specific examples thereof include kaolinite, dickite, nacrite, halloysite, antigorite, chrysitile, pyrophyllite, montmorillonite, beidellite, hectorite, saponite, stevencite, tetrasilicicmica, sodiumtaeniolite, commonmica, margarita, talc, vermiculite, phlogopite, xanthophyllite and chlorite.

These may be used singly or in combination. Of these, montmorillonite is preferable to achieve enhancement of gas barrier capability and mechanical strength.

Resin

Resins usable in the invention are described below with reference to specific examples. Preferred resins are not limited to a thermoplastic resin and a thermosetting resin. Examples thereof include a vinyl resin, a (meth)acrylic resin, an amide resin, a polycarbonate resin, a polyester resin, a silicone resin and a fluororesin, but are not limited to these resins.

Examples of the foregoing vinyl resin include a polyolefin resin such as a homo- or co-polymer of ethylene, propylene, styrene, butadiene, butane, isoprene, chloroprene, isobutylene or isoprene, or a cyclic olefin having norbornene skeleton; a vinyl chloride resin such as poly(vinyl chloride) or poly(vinylidene chloride); a vinyl acetate resin such as poly(vinyl acetate), poly(vinyl alcohol), poly(vinyl acetal) and poly(vinyl butyral).

Examples of a (meth)acryl resin include poly(acrylic acid), poly(methacrylic acid), polyacrylonitrile, poly[methyl (meth)acrylate], poly[ethyl(meth)acrylate], poly[2-ethylhexyl(meth)acrylate], poly[cyclohexyl(meth)acrylate], poly[benzyl(meth)acrylate], poly[hydroxyethyl (meth)acrylate], poly[methoxyethyl(meth)acrylate], poly[2-butoxyethyl (meth)acrylate], poly-(meth) acrylamide, and a N-substituted polyacrylamide such as poly[N-ethyl(meth)acrylamide], poly[N,N-diethyl(meth)acrylamide], poly[N-isopropyl (meth) acrylamide] and poly[N-t-octyl(meth)acrylamide].

Specific examples of the foregoing amide resin include an aliphatic amide resin such as 6,6-nylon, 6-nylon, 6,12-nylon, and an aromatic polyamide resin formed of an aromatic diamine such as phenylene diamine and an aromatic dicarboxylic acid or its derivative such as chloroterephthaloyl or chloroisophthaloyl or its derivatives.

Examples of the foregoing polycarbonate resin include reaction products of bisphenol A or phenols as its derivatives and phosgene or phenyldicarbonate.

Examples of the foregoing polyester resin include an aromatic polyester obtained by polymerization of a diol such as ethylene glycol, propylene glycol, or 1,4-butanediol and an aromatic dicarboxylic acid such as terephthalic acid; and an aliphatic polyester such as a polymer of a diol and an aliphatic dicarboxylic acid, e.g., succinic acid or valeric acid, a single polymer or copolymer of diols and a hydroxycarboxylic acid, or a copolymer of the foregoing diols, the foregoing aliphatic dicarboxylic aid and the foregoing hydroxycarboxlic acid.

The foregoing silicone resin preferably is one which contains an organic group such as an alkyl group or an aromatic group as a constituent unit, and more preferably an organic group such as methyl or phenyl. Specific examples of a silicone resin containing an organic group such as methyl or phenyl group dimethylpolysiloxane, methylphenylpolysiloxane, diphenylpolysiloxane and their modifiers.

Examples of the foregoing fluororesin include tetrafluoroethylene, hexafluoropropylene, a fluorinated vinyl, and perfluoroalkyl vinyl ether. These may be optionally used singly or in combination.

Stabilizer

A stabilizer selected from a phenol stabilizer, a hindered amine stabilizer, a phosphorus stabilizer and a sulfur stabilizer may be additionally incorporated to a layer provided on the resin substrate. Selection of such a stabilizer and its incorporation together with a part or all of a cellulose, an inorganic compound and a resin can inhibits deterioration of a matrix resin during fabrication, or variation of heat resistance, light stability or the like in the use environment.

There are usable phenol stabilizers known in the art and specific examples thereof include acrylate compounds such as 2-t-butyl-6-(3-t-butyl-2-hydroxy-5-methylbenzyl)-4-methylphenylacrylate or 2,4-di-t-amyl-6-[1-(3,5-di-t-amyl-2-2-hydroxyphenyl)ethyl]phenylacrylate, as described in JP 63-179953A or JP 1-168643A; alkyl-substituted phenol compounds such as octadecyl-3-(3,5-di-t-butyl-4-hydroxyphenyl)propionate, 2,2-methylenebis(4-methyl-6-t-butylphenol), 1,1,3-tris(2-methyl-4-hydroxy-5-t-butylphenyl)butane, 1,3,5-trimethyl-2,4,6-tris(3,5-di-t-butyl-4-hydroxybenzyl) benzene, tetrakis[methylene-3-(3',5'-di-t-butyl-4'-hydroxyphenylpropionate)]methane, that is, pentaerythrimethyl-tetrakis[3-(3,5-di-t-butyl-4-hydroxyphenylpropionate)], and triethylene glycol bis[3-(3-t-butyl-4-hydroxy-5-methylphenyl)]propionate; and triazine group-containing phenol compounds such as 6-(4-hydroxy-3,5-di-t-butylanilino)-2,4-bisoctylthio-1,3,5-triazine, 4-bisoctylthio-1,3,5-triazine, and 2-octylthio-4,6-bis(3,5-di-t-butyl-4-oxyanilino)-1,3,5-triazine.

Specific examples of a hindered amine stabilizer include bis(2,2,6,6-tetramethyl-4-piperidyl)sebacate, bis(2,2,6,6-tetramethyl-4-piperidylsuccinate, bis(1,2,2,6,6-pentamethyl-4-piperidyl)sebacate, bis(N-octoxy-2,2,6,6-tetramethyl-4-piperidyl)sebacate, bis(N-benzyloxy-2,2,6,6-tetramethyl-4-piperidyl)sebacate, bis(n-cyclohexyloxy-2,2,6,6-teramethyl-4-piperidyl)sebacate, bis(N-cyclohexyl-2,2,6,6-tetramethyl-4-piperudyl)sebacate, bis(1,2,2,6,6-pentamethyl-4-piperidyl)-2-(3,5-di-t-butyl-4-hydroxybenzyl)-2-butylmallonate, bis(1-acroyl-2,2,6,6-tetramethyl-4-piperidyl)-2,2-bis(3,5-di-t-butyl-4-hydroxybenzyl)-2-butylmalonate, bis(1,2,2,6,6-pentamethyl-4-piperidyldecanedioate, 2,2,6,6-tetramethyl-4-piperidyl methacrylate, 4-[(3,5-di-t-butyl-4-hydroxyphenyl)propionyloxy]-1-{2-[3-(3,5-di-t-butyl-4-hydroxyphenyl)propionyloxy]ethyl}-2,2,6,6-tetramethylpiperidine, and 2-methyl-2-(2,2,6,6-tetramethyl-4-piperidyl)amino-N-(2,2,6,6-tetramethyl-4-piperidyl)propionamide.

A phosphorus stabilizer is one which is usually used in resin industries and is nor specifically limited. Specific examples thereof include monophosphite compounds such as triphenyl phosphite, diphenyl isodecyl phosphite, tris(nonylphenyl)phosphite, tris(2,4-di-t-butylphenyl)phosphite, and 10-(3,5-di-t-butyl-4-hydroxybenzyl)-9,10-dihydro-9-oxa-10-phosphaphenathorene-10-oxide; diphosphite compounds such as 4,4'-butylidene-bis(3-methyl-6-t-butylphenyl-ditridecylphosphite), and 4,4'-isopropiridene-bis(phenyl-dialkyl($C_{12}$-$C_{15}$)phosphite. Of these compounds, a phosphite compound is preferred, and tris (nonylphenyl) phosphite, tris (dinonylphenyl) phosphite and tris(2,4-di-t-butylphenyl) phosphite are specifically preferred.

Preferred examples of a sulfur stabilizer include 3,3-thiodipropionate, dimyristyl-3,3'-thiodipropionate, distearyl-3,3-thiodipropionate, laurylstearyl-3,3-thiodipropionate, pentaerythritol-tetrakis(β-laurylthio-propionate, and 3,9-bis(2-dodecylthioethyl)-2,4,3,10-tetraoxaspiro[5,5]undecane.

The content of a stabilizer is optionally chosen within a range not vitiating the object of the invention, but is preferably from 0.01 to 2 parts by mass, and more preferably from 0.01 to 1 parts by mass, based on 100 parts by mass of the overall composite resin composition including cellulose fiber, inorganic compound and resin.

Resin Substrate

A resin substrate usable in the invention is suitably flexible resin sheet or film which is roll-rewindable. Examples of a resin used for the resin substrate include a vinyl polymer or copolymer such as copolymer of vinyl chloride and vinyl acetate, vinyl chloride resin, vinyl acetate resin, copolymer of vinyl acetate and vinyl alcohol, partially hydrolyzed copolymer of vinyl chloride and vinyl acetate, copolymer of vinyl chloride and vinylidene chloride, copolymer of vinyl chloride and acrylonitrile, copolymer of ethylene and vinyl alcohol, chlorinated polyvinyl chloride, copolymer of ethylene and vinyl chloride and copolymer of ethylene and vinyl acetate; cellulose derivatives such as nitrocellulose, cellulose acetate propionate (preferably exhibiting a acetyl group substitution degree of 1.8-2.3, and a propionyl group substitution degree of 0.1 to 1.0), diacetyl cellulose and cellulose acetate butyrate resin; copolymer of maleic acid and acrylic acid, ethyl acrylate copolymer, acrylonitrile-styrene copolymer, chlorinated polyethylene, copolymer of acrylonitrile, chlorinated polyethylene and styrene, methyl methacrylate/butadiene/styrene copolymer, acryl resin, polyvinyl alcohol resin, polyvinyl acetal resin, polyvinyl acetal resin, polyvinyl butyral resin, urethane resin, polyester urethane resin, polyether urethane resin, polycarbonate-polycarbonate resin, polyester resin, polyether resin, polyamide resin, amino resin, rubber resin such as styrene-butadiene resin or butadiene-acrylonitrile resin, silicone resin and fluororesin, but are not limited to these. The thickness of a resin substrate is preferably from 50 to 300 μm, and more preferably from 70 to 180 μm.

Formation of Coating Layer

In one preferred embodiment of the invention, the laminate of the invention is formed in such a manner that a cellulose fiber as described earlier and inorganic particles are dispersed or dissolved in a solvent to prepare a coating solution, and the coating solution is coated on a polymer substrate in a single layer form or is simultaneously coated in a multi-layer form, followed by being subjected to a heating treatment. There may optionally be added a resin, as described above, to the coating solution. Herein, the expression, "being simultaneously coated" represents that coating solutions for the individual constituent layers (for example, a cellulose fiber layer and an inorganic particle layer) are prepared, and when coating the coating solutions on the polymer substrate, coating and drying are not repeated for each of the coating solutions but simultaneous multi-layer coating is performed and drying is also simultaneously performed to form the individual constituent layers. Thus, before the total residual solvent amount in a lower layer reaches 70% or less (preferably 90% or less), a upper layer is provided.

A method of simultaneously coating the individual constituent layers is not specifically limited, including, for example, methods known in the art, such as a bar coater method, a curtain-coating method, a dip-coating method, a air-knife method, a slide coating method, a hopper coating method, a reverse roll coating method, a gravure coating method and an extrusion coating method. Of these coating methods, the slide coating method or the extrusion coating method is preferred. These methods are described with respect to coating on one side of the polymer substrate, but simultaneous double side coating is also performed similarly.

In the invention, the coating thickness may appropriately be chosen but preferably not less than 0.01 μm and not more than 1000 μm, and more preferably not less than 0.1 μm and not more than 100 μm.

The solvent content of the laminate or a lower constituent layer can be controlled by changing conditions, for example, a temperature condition in the drying process. The solvent content can be determined in gas chromatography under conditions suitable for detection of remained solvents.

The cellulose fiber described above is fixed by coating it on a resin substrate and drying and an ultraviolet ray- or electron beam-curing method may optionally be employed to fix the cellulose fiber into the resin substrate. Thus, a photopolymerization initiator is added to the dispersion of cellulose fiber and inorganic particles and coated on the resin substrate and exposed to ultraviolet rays or an electron beam to perform fixation onto the resin substrate.

Examples of such a photopolymerization initiator include photo-radical polymerization initiators such as acetophenone, acetophenone benzyl ketal, 1-hydroxycyclohexyl phenyl ketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzyl dimethyl ketal, 1-(4-isopropylphenyl)-2-hydroxy-2-methylpropane-1-one, and 2-hydroxy-2-methyl-1-phenylpropane-1-one. When performing fixation onto a resin substrate by a heat-curing method, a thermal-polymerization initiator such as a thermally radical-generating agent may be added to a dispersion of a cellulose fiber and inorganic particles. Specific examples of such a thermal-polymerization initiator include azo compounds such as 2,2'-azobisisobutylonitrile, and 2,2'-azobis(4-methoxy-2,4-dimethylvaleronitrile; and organic peroxides such as benzoyl peroxide, lauroyl peroxide, t-butylperoxypivarate and 1,1'-bis(t-butylperoxy)cyclohexane.

Even in the case when no initiator is contained, fixation becomes feasible by exposing a resin substrate to corona discharge or plasma discharge to activate the resin surface.

There will be further described a production method of a laminate comprising, on a resin substrate, one or more layers, in which a cellulose fiber, an inorganic lamellar compound and a resin are contained.

In one of the embodiments of the invention, the laminate is formed of layer(s) containing the afore-described cellulose fiber and an inorganic lamellar compound, and preferably a resin on a resin substrate, each of which may form a single layer, or two or three of which may be mixed and coated to form a layer. Layer(s) may be formed on one side or both sides of the resin substrate. When using a thermoplastic resin, for example, the resin is melted in a biaxial kneader and further thereto the cellulose fiber and the inorganic lamellar compound are added and meltingly kneaded to be dispersed in the resin. Then, the thus melted composite resin material is extruded to form a sheet, which is laminated onto a co-extruded resin substrate to a laminated sheet. Alternatively, a resin is dissolved in an appropriate solvent to form a resin solution, further thereto, a cellulose fiber and an inorganic lamellar compound are added to prepare a coating solution, which is coated or cascaded onto a resin substrate, thereafter, the solvent is removed to form a composite resin layer. However, the production method is not limited to these. In this composite material, an amount of a cellulose fiber and an inorganic lamellar compound to be incorporated is preferably from 10 to 90 parts by mass, more preferably 20 to 70 parts by mass, based on 100 parts by mass of the resin composite composition. Optionally, there may be incorporated various additives such as a stabilizer or a surfactant.

Next, there will be described the case of using a thermo-setting resin. Such a thermo-setting resin is one which is curable on exposure to ultraviolet rays or on heating. The cellulose fiber and inorganic lamellar compound, as described above and a monomer to form the resin are mixed, and a solvent, a stabilizer, a surfactant and the like are optionally added thereto to prepare a coating solution. The coating solution is coated or cascaded onto a resin substrate and then hardened to form a composite resin layer. A cellulose fiber and an inorganic lamellar compound are each incorporated preferably in an amount of 10 to 90 parts by mass, more preferably 20 to 70 parts by mass, based on 100 parts by mass of the composite resin composition. In preparation of the monomer composition containing a cellulose fiber and an inorganic lamellar compound, techniques known in the art are applicable thereto. In the case of the fiber-containing composition to be prepared being liquid, the individual components are compounded in prescribed amounts and dissolved, or uniformly mixed in a mixer or a blender and then kneaded by a kneader or roller to obtain a liquid curable composition. In the case of the fiber-containing composition to be prepared being solid, the individual components are compounded in prescribed amounts and dissolved, or uniformly mixed in a mixer or a blender, then kneaded by a kneader or roller, cooled to be solidified and then ground to obtain a solid fiber-containing composition.

In the case of a resin being UV-curable, the coating solution is cured in such a manner that coating solution containing a photopolymerization initiator is coated or cascaded onto a resin substrate and exposed to ultraviolet rays to be cured.

Examples of a coating method of a coating solution on a resin substrate include a gravure coater, a dip coater, a reverse coater, a wire-bar coater, a die coater, or by spray-coating or ink-jet coating, but are not limited to these. Coating the foregoing coating solution on a resin substrate is performed preferably at a wet layer thickness of 1 to 200 μm, more preferably 2 to 150 μm, and still more preferably to 80 μm. A wet layer thickness of less than 0.1 μm is insufficient in strength or gas barrier capability, while a wet layer thickness of more than 100 μm often results in lowered flexibility of a substrate material.

One aspect of the invention is directed to a production method of a resin composite material comprising cellulose fibers dispersed in a matrix resin, wherein the method comprises subjecting a resin composition containing the cellulose fibers and the matrix resin to extensional flow mixing.

Focusing on a cellulose fiber as a reinforcing material to be incorporated to a resin with regard to the foregoing problems or fiber composite materials known in the art being insufficient in dynamic characteristics such as tensile strength or bending strength, there were studied methods of compounding a cellulose fiber into a resin. As a result, it was found by the inventors of this application that when mixing a cellulose fiber obtained from a vegetable fiber such as pulp or the like with a resin, mixing by employing a kneader capable of performing extensional flow mixing, instead of using a biaxially kneading extruder or a mixer with a stirring blade, enabled to obtain a homogeneously dispersed resin composition without causing aggregation of the cellulose fiber in the resin. Thus, the constitution is as follows:

A production method of a resin composite material comprising a cellulose fiber dispersed in a matrix resin, wherein the method comprises subjecting a melt resin composition containing the cellulose fiber and the matrix resin to extensional flow mixing.

In the method described above, wherein the cellulose fibers preferably exhibit an average fiber diameter of not less than 2 nm and not more than 200 nm.

In the method described above, the cellulose fiber preferably is a surface-modified cellulose fiber.

Thus, according to the foregoing constitution, when microfibrillated cellulose fibers are dispersed in a matrix resin, superior dispersibility is achieved, enabling to obtain a fiber composite material which excels in thermal characteristics such as heat resistance, linear expansion coefficient or the like, as well as enhanced dynamic characteristics such as tensile strength, bending strength or the like.

The extensional flow mixing is a mixing method in which a melt composition containing a matrix resin and a material to be mixed is allowed to flow from a flow passage having a large cross-sectional area in the cross-section vertical to the flow direction of material to a slit-like passage having a smaller cross-sectional area, where the material to be mixed is broken down to smaller sizes by allowing the melt composition to pass over a prescribed length. Specifically, there is cited a melt-kneading method by using a kneader provided with an extensional-flow kneading die developed by Ultracki et al., as disclosed in U.S. Pat. No. 5,451,106, for example, as shown in FIG. 1, there is cited a kneading method by using a kneading device provided with an extensional-flow kneading chamber having large and small circular passages.

Figure 1:
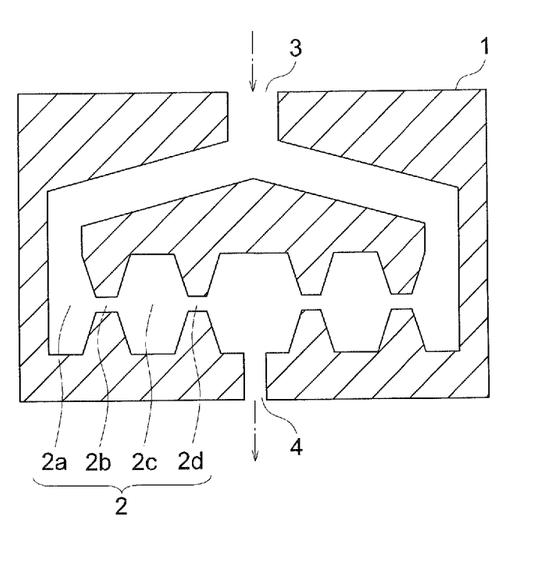
FIG. 1 shows a sectional view of an extensional-flow mixing chamber.

FIG. 1 shows a sectional view parallel to the passage of the resin composition through device 1 with passageways 2, inlet 3 and outlet 4. The resin composition is kneaded in such a manner that extensional-flow mixing is performed two-step-wise at the time when transferring from a first circular passage (2a) to a first slit passage (2b) and passing through the first slit passage (2b) and at the time when transferring from a second circular passage (2c) to a second slit passage (2d) and passing through the second slit passage (2d). The foregoing mixing is based on the principle that materials to be mixed are mixed with being extended and minutely dispersed along with change in flow rate when the resin composition passes through large and small passages 2a, 2b, 2c and 2d.

It was found by the inventors of this application that application of the foregoing extensional-flow mixing method to mixture of a cellulose fiber with a matrix resin enabled homogeneous dispersion of the cellulose with inhibiting cutting of fibers or destruction of crystallinity and maintaining a fibrous form without applying an excessive shearing force to the cellulose fiber. It was further proved that a fiber composite material obtained in this method resulted in marked improvements in dynamic characteristic and thermal characteristics (heat resistance, linear expansion coefficient and the like), as compared to a fiber composite material prepared in a conventional kneading method.

Production of Fiber Composite Material

There will be described a production method of a cellulose fiber composite material of the invention.

In cases when using a thermoplastic resin as a matrix resin, such a matrix resin is melted in a kneader which is installed with an extensional-flow chamber at the resin discharge portion and a cellulose fiber described earlier is added thereto and meltingly kneaded to be dispersed in the resin, and the thus melted composite resin material is extruded in a strand form and pelletized. The addition amount of a cellulose fiber is preferably from 5 to 60 parts by mass, and more preferably from 5 to 30 parts by mass, based on 100 parts by mass of a fiber composite material. In melt-kneading, there may be optionally incorporated additives such as a stabilizer, surfactant or the like. A method similar to a conventional method of molding a thermoplastic resin composition is applicable to obtain a mold by use of the obtained pellets. Specifically, a method such as ejection molding, extrusion molding, compression molding or hollow molding is conducted, in which dried pellets are placed into a molding machine installed with a metal mold of a prescribed form to be molded.

In cases when using a thermo-setting resin as a matrix resin, a cellulose fiber and a polymerizable monomer or oligomer to form a matrix resin are compounded in the above-described extensional-flow kneader to prepare a cellulose fiber-containing monomer composition, which is placed in a metal mold of a prescribed form to be molded or coated onto a substrate, followed by being polymerized. In the case of the monomer being ultraviolet-polymerizable or electron beam-polymerizable, there are used photo-radical polymerization initiators, such as acetophenone, acetophenone benzyl 1-hydrocyclohexyl phenyl ketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzyl dimethyl ketal, 1-(4-isopropylphenyl)-2-hydroxy-2-methylpropane-1-one, and 2-hydroxy-2-methyl-1-phenylpropane-1-one.

In the case of a thermo-setting matrix resin, a monomer composition containing a heat-polymerization initiator such as a thermally radical-generating agent is prepared and thermally molded via compression molding, transfer molding, ejection molding or the like. Examples of a heat-polymerization initiator used therein include an azo compound such as 2,2'-azobisisobutylonitrile, 2,2'-azobis(2,4-dimethylvaleronitrile), 2,2'-azobis(4-methoxy-2,4-dimethylvaleronitrile) or the like; and an organic peroxide compound such as benzoyl peroxide, lauroyl peroxide, t-butyl peroxypivalate, pivalic acid, 1,1'-bis(t-butylperoxy)cyclohexane, or the like.

A cellulose fiber is incorporated preferably in an amount of 5 to 60 parts by mass, more preferably, 5 to 30 parts by mass, based on 100 parts by mass of a fiber composite material. A stabilizer or surfactant may optionally be incorporated thereto.

EXAMPLES

The present invention will be further described with reference to examples but is by no means limited to these.

Example 1

Comparative Production Example 1-1

A sulfur pulp prepared from needle leaf trees was added to pure water at a concentration of 1.0% by mass and cellulose fibers were defibrated by using Excel Autohomogenizer (made by Nipon Seiki Seisakusho Ltd.) at a rotation rate of 3,000 rpm over 15 min. The thus obtained aqueous cellulose dispersion was designated as cellulose fiber A. From the result of scanning electron-microscopic observation, it was confirmed that the obtained cellulose fibers were defibrated to an average fiber diameter of 1 μm and micro-fibrillated.

Comparative Production Example 1-2

Cellulose fiber B was prepared similarly to the foregoing cellulose fiber A of Comparative Production Example 1-1, except that rotation was conducted at a rate of 10,000 rpm over 15 min. It was confirmed that the obtained cellulose fiber was defibrated to an average fiber diameter of 500 nm and micro-fibrillated.

Comparative Production Example 1-3

An aqueous cellulose fiber B dispersion prepared in Comparative Production Example 1-2 was filtered and after being washed with pure water, the residue was dried at 70° C. to obtain cellulose fiber B'.

Into an aqueous 1 mol % nitric acid solution containing methanol of 300 parts by mass was added 5 parts by mass of the cellulose fiber B' and dispersed to prepare a dispersion. To this dispersion were added a mixture of 100 parts by mass of methanol and 6 parts by mass of γ-methacryloxypropyltrimethoxysilane over 60 min. and stirred over 2 hrs. Then, the dispersed fibers were filtered, washed with 500 parts by mass of water twice and then washed with 200 parts by mass of ethanol twice. Further, after washing with 500 parts by mass of water twice, the fibrous residue was diluted with water so that the cellulose fiber B' was contained in an amount of 0.16 by mass, whereby cellulose fiber C was obtained. From the result of scanning electron-microscopic observation, it was proved that the obtained fiber was maintained at an average fiber diameter of 500 nm.

Comparative Production Example 1-4

The cellulose fiber B prepared in Comparative Production Example 1-2 was dispersed by Ultra Apex Mill. UAM015 (made by Kotobuki Kogyo Co., Ltd.) at a circumferential speed of 4 m/sec and using 1.0 mm beads over 1 hr. The cellulose fiber B was diluted with water so that the cellulose fiber B was contained in an amount of 0.1% by mass, whereby cellulose fiber D was obtained. The thus obtained fiber exhibited an average fiber diameter of 220 nm.

Comparative Production Example 1-5

The cellulose fiber D obtained in Comparative Production Example 1-4 was subjected to a surface treatment similarly to the foregoing comparative production example 1-3 to obtain cellulose fiber E. The thus obtained fiber exhibited an average fiber diameter of 220 nm.

Production Example 1-1

The cellulose fiber B prepared in Comparative Production Example 1-2 was dispersed by Ultra Apex Mill UAM015 (made by Kotobuki Kogyo Co., Ltd.) at a circumferential speed of 6 m/sec and using 1.0 mm beads over 1 hr. The cellulose fiber B was diluted with water so that the cellulose fiber B was contained in an amount of 0.1% by mass, whereby cellulose fiber F was obtained. The thus obtained fiber exhibited an average fiber diameter of 180 nm.

Production Example 1-2

The cellulose fiber F obtained in Production Example 1-1 was subjected to a surface treatment similarly to Comparative Example 1-3 to obtain cellulose fiber G. The thus obtained fiber exhibited an average fiber diameter of 180 nm.

Production Example 1-3

The cellulose fiber B prepared in Comparative Example 1-2 was dispersed by Ultra Apex Mill UAM015 (made by Kotobuki Kogyo Co., Ltd.) at a circumferential speed of 6 m/sec and using 0.5 mm beads over 1 hr. The cellulose fiber B was diluted with water so that the cellulose fiber B was contained in an amount of 0.1% by mass, whereby cellulose fiber H was obtained. The thus obtained fiber exhibited an average fiber diameter of 50 nm.

Production Example 1-4

The cellulose fiber H obtained in Production Example 1-3 was subjected to a surface treatment similarly to Comparative Example 1-3 to obtain cellulose fiber I. The thus obtained fiber exhibited an average fiber diameter of 50 nm.

Production Example 1-5

The cellulose fiber B prepared in Comparative Production Example 1-2 was dispersed by Ultra Apex Mill UAM015 (made by Kotobuki Kogyo Co., Ltd.) at a circumferential speed of 6 m/sec, using 0.05 mm beads over 1 hr. The cellulose fiber B was diluted with water so that the cellulose fiber B was contained in an amount of 0.1% by mass, whereby cellulose fiber J was obtained. The thus obtained fiber exhibited an average fiber diameter of 20 nm.

Production Example 1-6

The cellulose fiber J obtained in Production Example 1-5 was subjected to a surface treatment similarly to Comparative Production Example 1-3 to obtain cellulose fiber K. The thus obtained fiber exhibited an average fiber diameter of 20 nm.

Production Example 1-7

The cellulose fiber B obtained in Comparative Production Example 1-2 in an amount equivalent to 1 g by dry mass, 0.012 g of TEMPO (2,2,6,6-tetramethylpiperidine-1-oxyl free radical) and 0.125 g of sodium bromide were dispersed in 100 ml of water. Then, an aqueous 13% by mass sodium hypochlorite solution was added thereto to initiate the reaction so that the quantity of sodium hypochlorite was 2.5 mmol. During the reaction, the pH of the reaction mixture was maintained at 10.5, while dropwise adding an aqueous 0.5 M sodium hydroxide solution. The reaction was considered to be completed at the time when no change in pH was observed. The reaction product was filtered off with a glass filter, then, washing with enough water and filtration were repeated five times, and the reaction product was diluted with water so that the cellulose fiber B was contained in an amount of 0.1% by mass. The thus prepared dispersion was treated for 1 hr. with an ultrasonic disperser to obtain cellulose fiber L exhibiting an average fiber diameter of 12 nm.

Preparation of Polymer Film Laminate Samples 1-1 to 1-30:

A 100 μm thick biaxially stretched polyethylene terephthalate film (also denoted simply as PET film) and a 100 μm thick triacetate acetate film as a substrate film (also denoted simply as TAC film), as shown in Table 1, were each subjected to a corona discharge treatment. Using an aqueous cellulose fiber dispersion obtained in each of Comparative Production Examples 1-1 to 1-5 and Production Examples 1-1 to 1-7 and inorganic particles, as shown in Table 1, a coating solution was prepared. The thus prepared coating solution was coated on each of the films by an air-knife coating method under 20° C. and 55% RH and dried at 120° C. over 30 min to form a layer with a dry thickness of 0.8 μm. Similarly, coating solutions shown in Table 1 were each coated on a 100 μm thick triacetyl cellulose film to prepare polymer film laminate samples 1-1 to 1-30.

Test pieces used for measurement of physical properties were prepared and evaluated with respect to the following items. The evaluation results are shown in Table 1. Evaluation of Polymer Film Laminate (1) Bending Elasticity:

The foregoing polymer film laminates were each cut to a test piece of 140 mm×12 mm and measured with respect to bending elasticity (MPa) at a distance between supporting points of 80 mm, a bending rate of 2 mm/min and 20° C.

(2) Linear Expansion Coefficient:

The foregoing polymer film laminates were each cut to a test piece of 150 mm×50 mm and measured with respect to linear expansion coefficient with varying a temperature in the range of 40 to 80° C. There was used a measurement instrument, EXSTAR 6000 TMA/SS6100 (SEIKO INSTRUMENT INC.).

(3) Scratch Test (Scratch Resistance):

The foregoing polymer film laminates were each cut to a test piece of 140 mm×50 mm. The surface of the individual test piece was scratched by a metal needle, while applying a load to the test piece to determine a minimum load, expressed in g, to form a scratch mark (scratch resistance).

(4) Tensile Strength:

The foregoing polymer film laminates were each cut to a test piece of 150 mm×50 mm and the individual test piece was subjected to tensile testing by using a tensile tester, made by INSTRON Co. The tensile testing was conducted at a tensile rate of 1 cm per min., by using a 5 cm long and 1 cm wide piece.

TABLE 1

| Sample No. | Cellulose Fiber (nm*[1]) | Inorganic Particle (nm*[2]) | Mass Ratio*[3] | Solvent | Resin Substrate | Bending Elasticity (MPa) | Linear Expansion Coefficient (ppm) | Scratch Resistance (g) | Tensile Strength (MPa) | Remark |
|---|---|---|---|---|---|---|---|---|---|---|
| 1-1 | A(1000) | — | — | water | PET | 3000 | 70 | 20 | 84 | Comp. |
| 1-2 | B(500) | — | — | water | PET | 2700 | 70 | 24 | 85 | Comp. |
| 1-3 | C(500)*[4] | — | — | water | PET | 2700 | 60 | 25 | 86 | Comp. |
| 1-4 | C(500)*[4] | RX200*[5](12) | 1/9 | water | PET | 2700 | 61 | 35 | 86 | Comp. |
| 1-5 | D(220) | — | — | water | PET | 2500 | 56 | 30 | 92 | Comp. |
| 1-6 | E(220)*[4] | — | — | water | PET | 2400 | 55 | 30 | 93 | Comp. |
| 1-7 | E(220)*[4] | RX200*[5](12) | 1/9 | water | PET | 2400 | 49 | 32 | 93 | Comp. |

TABLE 1-continued

| Sample No. | Cellulose Fiber (nm*[1]) | Inorganic Particle (nm*[2]) | Mass Ratio*[3] | Solvent | Resin Substrate | Bending Elasticity (MPa) | Linear Expansion Coefficient (ppm) | Scratch Resistance (g) | Tensile Strength (MPa) | Remark |
|---|---|---|---|---|---|---|---|---|---|---|
| 1-8 | F(180) | — | — | water | PET | 2000 | 32 | 50 | 110 | Inv. |
| 1-9 | G(180)*[4] | — | — | water | PET | 1800 | 20 | 50 | 111 | Inv. |
| 1-10 | G(180)*[4] | RX200*[5](12) | 1/9 | water | PET | 1600 | 22 | 60 | 111 | Inv. |
| 1-11 | G(180)*[4] | *[6](12000) | 1/9 | water | PET | 1800 | 24 | 62 | 110 | Comp. |
| 1-12 | H(50) | — | — | water | PET | 1500 | 22 | 58 | 125 | Inv. |
| 1-13 | H(50) | A200*[7](12) | 1/9 | water | PET | 1500 | 22 | 68 | 124 | Inv. |
| 1-14 | I(50)*[4] | — | — | water | PET | 1400 | 13 | 56 | 126 | Inv. |
| 1-15 | I(50)*[4] | RX200*[5](12) | 1/9 | water | PET | 1400 | 12 | 66 | 123 | Inv. |
| 1-16 | J(20) | — | — | water | PET | 1200 | 13 | 60 | 140 | Inv. |
| 1-17 | J(20) | A200*[7](12) | 1/9 | water | PET | 1200 | 12 | 70 | 141 | Inv. |
| 1-18 | K(20)*[4] | — | — | water | PET | 1100 | 8 | 62 | 145 | Inv. |
| 1-19 | K(20)*[4] | RX200*[5](12) | 1/9 | water | PET | 1100 | 7 | 72 | 142 | Inv. |
| 1-20 | L(12)*[4] | — | — | water | PET | 1000 | 6 | 73 | 152 | Inv. |
| 1-21 | L(12)*[4] | A200*[7](12) | 1/9 | water | PET | 1000 | 5 | 90 | 152 | Inv. |
| 1-22 | L(12)*[4] | A200*[7](12) | 3/7 | water | PET | 1000 | 6 | 105 | 150 | Inv. |
| 1-23 | L(12)*[4] | A200*[7](12) | 5/5 | water | PET | 1000 | 7 | 125 | 149 | Inv. |
| 1-24 | L(12)*[4] | a*[8](300) | 1/9 | water | PET | 1100 | 7 | 93 | 157 | Inv. |
| 1-25 | L(12)*[4] | b*[9](500) | 1/9 | water | PET | 1200 | 8 | 95 | 155 | Inv. |
| 1-26 | L(12)*[4] | c*[10](1000) | 1/9 | water | PET | 1200 | 8 | 96 | 159 | Inv. |
| 1-27 | L(12)*[4] | d*[11](1200) | 1/9 | water | PET | 1400 | 12 | 101 | 154 | Comp. |
| 1-28 | L(12)*[4] | — | — | water | TAC | 400 | 6 | 55 | 205 | Inv. |
| 1-29 | L(12)*[4] | A200*[7](12) | 1/9 | water | TAC | 350 | 5 | 80 | 210 | Inv. |
| 1-30 | A(1000) | — | — | water | TAC | 500 | 31 | 15 | 130 | Comp. |

*[1]average fiber diameter (nm),
*[2]average particle size (nm),
*[3]mass ratio of (inorganic particle)/(cellulose fiber),
*[4]cellulose fiber having been surface-modified,
*[5]silica particle AEROSILE LR200 (hydrophobic particle) having volume average particle size of 12 nm, made by AEROSILE Co.,
*[6]silica particle having a volume average particle size (hydrophilic particle) of 12 μm, made by Core Front Co.
*[7]silica particle AEROSILE LR200 (hydrophilic particle) having volume average particle size of 12 nm, made by AEROSILE Co.,
*[8]silica particle having a volume average particle size of 0.3 μm (hydrophilic particle),
*[9]silica particle having a volume average particle size of 0.5 μm (hydrophilic particle),
*[10]silica particle having a volume average particle size of 1.0 μm (hydrophilic particle)
*[11]silica particle having a volume average particle size of 1.2 μm (hydrophilic particle)

As is apparent from Table 1, it was proved that the present invention achieved reduced bending elasticity and enhanced flexibility. It was further proved that the invention also achieved reduced linear expansion, enhanced dimensional stability for temperature, improved scratch resistance as abrasion resistance and enhanced tensile strength at the time when film was bent.

Example 2

Production Example 2-1

A sulfur pulp prepared from needle-leaf trees was added to pure water at a concentration of 0.1% by mass and ground fifty times by using a stone mill type grinder (Pure Fine Mill KMG 1-10, made by Kurita Kikai Seisakusho Co.) at 1500 rpm to obtain an aqueous fibrillated cellulose fiber dispersion. The obtained aqueous cellulose fiber dispersion was filtered, washed with pure water and dried at 70° C. to obtain cellulose fiber A. From scanning electron-microscopic observation, it was confirmed that the obtained cellulose fibers were defibrated to an average fiber diameter of 4 nm for micro-fibrillation.

Production Example 2-2

To 500 parts by mass of an anhydrous butyric acid/pyridine (at a molar ratio of 1/1) was added 10 parts by mass of the micro-fibrillated cellulose fiber obtained in Production Example 2-1 and dispersed with stirring for 3 hrs. at room temperature. The thus dispersed fiber was filtered, washed with 500 parts by mass of water three times and washed with 200 parts by mass of ethanol two times. The fiber was washed with 500 parts by mass of water two times and then dried at 70° C. to obtain surface-modified cellulose fiber B. From scanning electron-microscopic observation, it was confirmed that the average fiber diameter was maintained at 4 nm.

Production Example 2-3

Cellulose fiber C was obtained similarly to Production Example 2-1, except that grinding treatment to defibrate cellulose fibers was conducted 30 times. From scanning electron-microscopic observation, it was confirmed that the obtained cellulose fibers were defibrated to an average fiber diameter of 40 nm to be micro-fibrillated.

Production Example 2-4

To 500 parts by mass of an anhydrous butyric acid/pyridine (at a molar ratio of 1/1) was added 10 parts by mass of the micro-fibrillated cellulose fiber obtained in Production Example 2-3 and dispersed with stirring for 3 hrs. at room temperature. The thus dispersed fiber was filtered, washed with 500 parts by mass of water three times and washed with 200 parts by mass of ethanol two times. The fiber was washed with 500 parts by mass of water two times and then dried at 70° C. to obtain surface-modified cellulose fiber D. From scanning electron-microscopic observation, it was confirmed that the average fiber diameter was maintained at 40 nm.

Production Example 2-5

Cellulose fiber E was obtained similarly to Production Example 2-1, except that grinding treatment to defibrate cellulose fibers was conducted 20 times. From scanning electron-microscopic observation, it was confirmed that the obtained cellulose fibers were defibrated to an average fiber diameter of 90 nm to be micro-fibrillated.

Production Example 2-6

To 500 parts by mass of an anhydrous butyric acid/pyridine (at a molar ratio of 1/1) was added 10 parts by mass of the micro-fibrillated cellulose fiber obtained in Production Example 2-5 and dispersed with stirring for 3 hrs. at room temperature. The thus dispersed fiber was filtered, washed with 500 parts by mass of water three times and washed with 200 parts by mass of ethanol two times. The fiber was washed with 500 parts by mass of water two times and then dried at 70° C. to obtain surface-modified cellulose fiber F. From scanning electron-microscopic observation, it was confirmed that the average fiber diameter was maintained at 90 nm.

Production Example 2-7

Cellulose fiber G was obtained similarly to Production Example 2-1, except that grinding treatment to defibrate cellulose fibers was conducted 10 times. From scanning electron-microscopic observation, it was confirmed that the obtained cellulose fibers were defibrated to an average fiber diameter of 200 nm to be micro-fibrillated.

Production Example 2-8

To 500 parts by mass of an anhydrous butyric acid/pyridine (at a molar ratio of 1/1) was added 10 parts by mass of the micro-fibrillated cellulose fiber obtained in Production Example 2-7 and dispersed with stirring for 3 hrs. at room temperature. The thus dispersed fiber was filtered, washed with 500 parts by mass of water three times and washed with 200 parts by mass of ethanol two times. The fiber was washed with 500 parts by mass of water two times and then dried at 70° C. to obtain surface-modified cellulose fiber H. From scanning electron-microscopic observation, it was confirmed that the average fiber diameter was maintained at 200 nm.

Production Example 2-9

Cellulose fiber I was obtained similarly to Production Example 2-1, except that grinding treatment to defibrate cellulose fibers was conducted 5 times. From scanning electron-microscopic observation, it was confirmed that the obtained cellulose fibers were defibrated to an average fiber diameter of 210 nm to be micro-fibrillated.

Production Example 2-10

To 500 parts by mass of an anhydrous butyric acid/pyridine (at a molar ratio of 1/1) was added 10 parts by mass of the micro-fibrillated cellulose fibers obtained in Production Example 2-9 and dispersed with stirring for 3 hrs. at room temperature. The thus dispersed fiber was filtered, washed with 500 parts by mass of water three times and washed with 200 parts by mass of ethanol two times. The fiber was washed with 500 parts by mass of water two times and then dried at 70° C. to obtain surface-modified cellulose fiber J. From scanning electron-microscopic observation, it was confirmed that the average fiber diameter was maintained at 210 nm.

Production Example 2-11

To an aqueous 1 mol % nitric acid solution were added 300 parts by mass of methanol and 5 parts by mass of micro-fibrillated cellulose fiber, obtained in Production Example 2-1, and dispersed. Further thereto was added a mixture of 100 parts by mass of methanol and 6 parts by mass of γ-methacryloxypropyltrimethoxysilane with stirring at 50° C. over 60 min. and stirred over 2 hrs. Then, the dispersed fibers were filtered, washed with 500 parts by mass of water three times, washed with 200 parts by mass of ethanol two times, further washed with 500 parts by mass of water twice and dried at 70° C. to obtain surface-modified cellulose fiber K. From scanning electron-microscopic observation, it was confirmed that the average fiber diameter of the thus obtained cellulose fiber was maintained at 4 nm.

Production Example 2-12

To an aqueous 1 mol % nitric acid solution were added 300 parts by mass of methanol and 5 parts by mass of micro-fibrillated cellulose fiber, obtained in Production Example 2-3, and dispersed. Further thereto was added a mixture of 100 parts by mass of methanol and 6 parts by mass of γ-methacryloxypropyltrimethoxysilane with stirring at 50° C. over 60 min. and stirred over 2 hrs. Then, the dispersed fibers were filtered, washed with 500 parts by mass of water three times, washed with 200 parts by mass of ethanol two times, further washed with 500 parts by mass of water twice and dried at 70° C. to obtain surface-modified cellulose fiber L. From scanning electron-microscopic observation, it was confirmed that the average fiber diameter of the thus obtained cellulose fiber was maintained at 40 nm.

Production Example 2-13

To an aqueous 1 mol % nitric acid solution were added 300 parts by mass of methanol and 5 parts by mass of micro-fibrillated cellulose fiber, obtained in Production Example 2-5, and dispersed. Further thereto was added a mixture of 100 parts by mass of methanol and 6 parts by mass of γ-methacryloxypropyltrimethoxysilane with stirring at 50° C. over 60 min. and stirred over 2 hrs. Then, the dispersed fibers were filtered, washed with 500 parts by mass of water three times, washed with 200 parts by mass of ethanol two times, further washed with 500 parts by mass of water twice and dried at 70° C. to obtain surface-modified cellulose fiber M. From scanning electron-microscopic observation, it was confirmed that the average fiber diameter of the thus obtained cellulose fiber was maintained at 90 nm.

Production Example 2-14

To an aqueous 1 mol % nitric acid solution were added 300 parts by mass of methanol and 5 parts by mass of micro-fibrillated cellulose fiber, obtained in Production Example 2-7, and dispersed. Further thereto was added a mixture of 100 parts by mass of methanol and 6 parts by mass of γ-methacryloxypropyltrimethoxysilane with stirring at 50° C. over 60 min. and stirred over 2 hrs. Then, the dispersed fibers were filtered, washed with 500 parts by mass of water three times, washed with 200 parts by mass of ethanol two times, further washed with 500 parts by mass of water twice and dried at 70° C. to obtain surface-modified cellulose fiber N. From scanning electron-microscopic observation, it was confirmed that the average fiber diameter of the thus obtained cellulose fiber was maintained at 200 nm.

Production Example 2-15

To an aqueous 1 mol % nitric acid solution were added 300 parts by mass of methanol and 5 parts by mass of microfibrillated cellulose fiber, obtained in Production Example 2-9, and dispersed. Further thereto was added a mixture of 100 parts by mass of methanol and 6 parts by mass of γ-methacryloxypropyltrimethoxysilane with stirring at 50° C. over 60 min. and stirred over 2 hrs. Then, the dispersed fibers were filtered, washed with 500 parts by mass of water three times, washed with 200 parts by mass of ethanol two times, further washed with 500 parts by mass of water twice and dried at 70° C. to obtain surface-modified cellulose fiber O. From scanning electron-microscopic observation, it was confirmed that the average fiber diameter of the thus obtained cellulose fiber was maintained at 40 nm.

Preparation of Laminate:

There were prepared laminates of Examples 2-1 to 2-16 and Comparative Examples 2-1 to 2-5, as follows. Raw materials were blended according to the composition (expressed in part by mass) shown in Table 2-1 to prepare coating solutions A, B and C. First, coating solution A was coated on a 50 μm thick polyethylene terephthalate sheet by a wire-bar coater so that a layer thickness after being polymerized or dried was 25 μm. After coating, in the case of a polymerizable composition, the coated layer was exposed to ultraviolet rays exhibiting a main wavelength of 365 nm and an intensity of 20 mW/cm² to perform polymerization to form a layer; in the case of an aqueous dispersion composition, the coated layer was dried at 70° C. over 3 hrs. to form to form a first layer. On this layer was coated coating solution B in a manner similar to the foregoing to form a second layer and further thereon was coated coating solution C to form a third layer, performing multi-layer formation. As shown in Table 2-2, in the case of an example or comparative example not having any one of coating solutions A, B and C, coating solutions were coated in the order set forth above and dried or polymerized to obtain a multi-layer laminate. There are shown coating solution composition and layer constitution in Tables 2 and 3. Obtained evaluation results are also shown in Tables 2 and 3.

Evaluation of Physical Properties of Laminate:

Laminates produced in Examples was evaluated with respect to physical property, as follows.

(1) Linear Expansion Coefficient:

A 150×50 mm test piece was prepared and measured with respect to linear expansion coefficient (expressed in ppm) by using EXSTAR6000TMA/SS6100 (made by Seiko Instrument Co.) within the range of 40 to 80° C.

(2) Tensile Strength:

Tensile strength (expressed in MPa) was measured in accordance with JIS K7127 by using tensile testing machine Strograph WI-1), made by TOYO SEIKI SEISAKUSHI Ltd. A test piece was 5 cm in length and 1 cm in width and the tensile speed was 1 cm/min.

(3) Oxygen Transmittance:

Oxygen transmittance (expressed in cm³/m²·24 h·MPa) was measured using an oxygen transmissometer, MOCON OX-TRAN 2/21 (made by Modern Control Co.) under an atmosphere of 30° C. and 70% RH.

(4) Moisture Transmittance:

Moisture transmittance was measured using a moisture transmissometer, MOCON PERMATRAN-W 3/21 (made by Modern Control Co.) under an atmosphere of 40° C. and 90% RH.

TABLE 2-1

| | | | | Example No. | | | | | | | | | |
|---|---|---|---|---|---|---|---|---|---|---|---|---|---|
| | | | | 2-1 | 2-2 | 2-3 | 2-4 | 2-5 | 2-6 | 2-7 | 2-8 | 2-9 | 2-10 |
| Composition | Coating Solution A | Methyl Methacrylate | | — | — | — | — | — | — | — | — | — | — |
| | | Cellulose Fiber | A (4 nm) | — | — | — | — | 20 | — | — | — | — | — |
| | | | C (40 nm) | — | — | — | — | — | 20 | — | — | — | — |
| | | | G (200 nm) | — | — | — | — | — | — | — | — | — | — |
| | | | K *¹ (4 nm) | 20 | — | — | — | — | — | 20 | — | — | — |
| | | | L *¹ (40 nm) | — | 20 | — | — | — | — | — | 20 | — | — |
| | | | M *¹ (90 nm) | — | — | 20 | — | — | — | — | — | 20 | — |
| | | | N *¹ (200 nm) | — | — | — | 20 | — | — | — | — | — | 20 |
| | | | O *¹ (210 nm) | — | — | — | — | — | — | — | — | — | — |
| | | Polymerization Initiator | | — | — | — | — | — | — | — | — | — | — |
| | | Stabilizer A | | — | — | — | — | — | — | — | — | — | — |
| | | Stabilizer B | | — | — | — | — | — | — | — | — | — | — |
| | | Distilled Water | | 100 | 100 | 100 | 100 | 100 | 100 | 100 | 100 | 100 | 100 |
| | Coating Solution B | Methyl Methacrylate | | 50 | 50 | 50 | 50 | 50 | 50 | — | — | — | — |
| | | Inorganic lamellar Compound | | 15 | 15 | 15 | 15 | 15 | 15 | 3 | 3 | 3 | 3 |
| | | Polymerization Initiator | | 0.5 | 0.5 | 0.5 | 0.5 | 0.5 | 0.5 | — | — | — | — |
| | | Stabilizer A | | 0.2 | 0.2 | 0.2 | 0.2 | 0.2 | 0.2 | — | — | — | — |
| | | Stabilizer B | | 0.05 | 0.05 | 0.05 | 0.05 | 0.05 | 0.05 | — | — | — | — |
| | | Distilled Water | | — | — | — | — | — | — | 100 | 100 | 100 | 100 |
| | Coating Solution C | Methyl Methacrylate | | — | — | — | — | — | — | 50 | 50 | 50 | 50 |
| | | Polymerization Initiator | | — | — | — | — | — | — | 0.5 | 0.5 | 0.5 | 0.5 |
| | | Stabilizer A | | — | — | — | — | — | — | 0.2 | 0.2 | 0.2 | 0.2 |
| | | Stabilizer B | | — | — | — | — | — | — | 0.05 | 0.05 | 0.05 | 0.05 |
| Physical Property | Linear Expansion Coefficient (ppm) | | | 13 | 14 | 16 | 14 | 16 | 18 | 16 | 17 | 21 | 20 |
| | Tensile Strength (MPa) | | | 260 | 240 | 210 | 200 | 205 | 203 | 210 | 220 | 210 | 215 |
| | Oxygen Transmittance [cm³/(m²·24 h·MPa)] | | | 1.3 | 1.5 | 1.6 | 1.8 | 1.9 | 1.7 | 1.5 | 1.8 | 1.7 | 1.9 |
| | Moisture Transmittance [g/(m²·24 h)] | | | 0.21 | 0.31 | 0.42 | 0.48 | 0.50 | 0.51 | 0.46 | 0.45 | 0.47 | 0.49 |

TABLE 2-1-continued

|  |  |  | Example No. | | | | | | Comparative Example No. | | | | |
|---|---|---|---|---|---|---|---|---|---|---|---|---|---|
|  |  |  | 2-11 | 2-12 | 2-13 | 2-14 | 2-15 | 2-16 | 2-1 | 2-2 | 2-3 | 2-4 | 2-5 |
| Composition | Coating Solution A | Methyl Methacrylate | 50 | 50 | 50 | 50 | 50 | 50 | — | 50 | — | — | 50 |
|  |  | Cellulose Fiber A (4 nm) | — | — | — | — | 15 | — | — | — | — | — | — |
|  |  | C (40 nm) | — | — | — | — | — | 15 | — | — | — | — | — |
|  |  | G (200 nm) | — | — | — | — | — | — | — | — | — | — | — |
|  |  | K *¹ (4 nm) | 15 | — | — | — | — | — | — | 15 | 20 | — | — |
|  |  | L *¹ (40 nm) | — | 15 | — | — | — | — | — | — | — | — | — |
|  |  | M *¹ (90 nm) | — | — | 15 | — | — | — | — | — | — | — | — |
|  |  | N *¹ (200 nm) | — | — | — | 15 | — | — | — | — | — | — | — |
|  |  | O *¹ (210 nm) | — | — | — | — | — | — | — | — | — | — | 15 |
|  |  | Polymerization Initiator | 0.5 | 0.5 | 0.5 | 0.5 | 0.5 | 0.5 | — | — | — | — | 0.5 |
|  |  | Stabilizer A | 0.2 | 0.2 | 0.2 | 0.2 | 0.2 | 0.2 | — | — | — | — | 0.2 |
|  |  | Stabilizer B | 0.05 | 0.05 | 0.05 | 0.05 | 0.05 | 0.05 | — | — | — | — | 0.05 |
|  |  | Distilled Water | — | — | — | — | — | — | — | — | 100 | — | — |
|  | Coating Solution B | Methyl Methacrylate | 50 | 50 | 50 | 50 | 50 | 50 | 50 | — | — | — | 50 |
|  |  | Inorganic lamellar Compound | 15 | 15 | 15 | 15 | 15 | 15 | 15 | — | — | 3 | 15 |
|  |  | Polymerization Initiator | 0.5 | 0.5 | 0.5 | 0.5 | 0.5 | 0.5 | 0.5 | — | — | — | 0.5 |
|  |  | Stabilizer A | 0.2 | 0.2 | 0.2 | 0.2 | 0.2 | 0.2 | 0.2 | — | — | — | 0.2 |
|  |  | Stabilizer B | 0.05 | 0.05 | 0.05 | 0.05 | 0.05 | 0.05 | 0.05 | — | — | — | 0.05 |
|  |  | Distilled Water | — | — | — | — | — | — | — | — | — | 100 | — |
|  | Coating Solution C | Methyl Methacrylate | — | — | — | — | — | — | — | 50 | 50 | 50 | — |
|  |  | Polymerization Initiator | — | — | — | — | — | — | — | 0.5 | 0.5 | 0.5 | — |
|  |  | Stabilizer A | — | — | — | — | — | — | — | 0.2 | 0.2 | 0.2 | — |
|  |  | Stabilizer B | — | — | — | — | — | — | — | 0.05 | 0.05 | 0.05 | — |
| Physical Property | Linear Expansion Coefficient (ppm) | | 6 | 8 | 11 | 13 | 12 | 14 | 48 | 43 | 45 | 41 | 43 |
|  | Tensile Strength (MPa) | | 270 | 250 | 240 | 220 | 230 | 240 | 85 | 95 | 102 | 105 | 104 |
|  | Oxygen Transmittance [cm³/(m² · 24 h · MPa)] | | 1.2 | 1.3 | 1.4 | 1.6 | 1.5 | 1.6 | 21 | 26 | 20 | 12 | 15 |
|  | Moisture Transmittance [g/(m² · 24 h)] | | 0.19 | 0.22 | 0.26 | 0.21 | 0.35 | 0.41 | 3.4 | 3.9 | 3.7 | 2.1 | 1.8 |

*¹ Surface-modified

In Table 2-1, Polymerization Initiator, Inorganic Lamellar Compound, Stabilizer A and Stabilizer B are as follows:

Polymerization Initiator: 1-hydroxycyclohexyl phenyl ketone, (IRGACURE 184, Ciba Japan Co.), Inorganic Lamellar Compound: natural montmorillonite (Kunipia P, KUNUMINE INDUSTRIES Co., Ltd.), Stabilizer A: tetrakis(1,2,2,6,6-pentamethylpiperidyl)-butane tetracarboxylate, Stabilizer B: 2,2'-methylenebis(4,6-di-t-butylphenyl)-2-ethylhexylphosphate.

As is apparent from the evaluation results of physical properties, shown in Table 2-1, it was proved that laminates (fiber composite materials) of Examples 2-1 to 2-16 were superior in mechanical strength and resulted in markedly reduced linear expansion coefficient and enhanced gas barrier capability.

Preparation of Laminate

Raw materials were mixed according to the composition (expressed in part by mass) shown in Table 2-3 to prepare a coating solution in which a cellulose fiber and an inorganic compound were dispersed in a resin solution. The thus prepared coating solution was coated on a 50 μm thick polyethylene terephthalate sheet by a wire bar coater so that a layer thickness after removing a solvent was 50 μm, and subjected to air-drying to remove a solvent to obtain a laminate. The obtained laminates were each subjected to vacuum drying at 70° C. for 24 hrs. and to measurements described above. Evaluation results are shown in Table 2-2.

TABLE 2-2

|  |  |  | Example No. | | | | | | Comparative Example No. | | | |
|---|---|---|---|---|---|---|---|---|---|---|---|---|
|  |  |  | 2-17 | 2-18 | 2-19 | 2-20 | 2-21 | 2-22 | 2-5 | 2-7 | 2-8 | 2-9 |
| Composition | Polycarbonate Resin | | 70 | 70 | 70 | 70 | 70 | 70 | 70 | 70 | 70 | 70 |
|  | Cellulose Fiber | A (4 nm) | — | — | — | — | 15 | — | — | — | — | — |
|  |  | C (40 nm) | — | — | — | — | — | 15 | — | — | — | — |
|  |  | G (200 nm) | — | — | — | — | — | — | — | — | — | — |
|  |  | B *¹ (4 nm) | 15 | — | — | — | — | — | 30 | — | — | — |
|  |  | D *¹ (40 nm) | — | 15 | — | — | — | — | — | 30 | — | — |
|  |  | F *¹ (90 nm) | — | — | 15 | — | — | — | — | — | — | — |
|  |  | H *¹ (200 nm) | — | — | — | 15 | — | — | — | — | — | — |
|  |  | J *¹ (210 nm) | — | — | — | — | — | — | — | — | — | 15 |
|  | Inorganic Lamellar Compound | | 15 | 15 | 15 | 15 | 15 | 15 | — | — | 30 | 15 |
|  | Stabilizer A | | 0.2 | 0.2 | 0.2 | 0.2 | 0.2 | 0.2 | 0.2 | 0.2 | 0.2 | 0.2 |
|  | Stabilizer B | | 0.05 | 0.05 | 0.05 | 0.05 | 0.05 | 0.05 | 0.05 | 0.05 | 0.05 | 0.05 |
|  | Methylene Chloride (solvent) | | 600 | 600 | 600 | 600 | 600 | 600 | 600 | 600 | 600 | 600 |

TABLE 2-2-continued

|  |  | Example No. | | | | | | Comparative Example No. | | | |
| --- | --- | --- | --- | --- | --- | --- | --- | --- | --- | --- | --- |
|  |  | 2-17 | 2-18 | 2-19 | 2-20 | 2-21 | 2-22 | 2-5 | 2-7 | 2-8 | 2-9 |
| Physical Property | Linear Expansion Coefficient (ppm) | 6 | 7 | 10 | 11 | 13 | 12 | 58 | 61 | 52 | 50 |
|  | Tensile Strength (MPa) | 305 | 280 | 275 | 280 | 285 | 275 | 89 | 102 | 95 | 110 |
|  | Oxygen Transmittance [cm$^3$/(m$^2$ · 24 h · MPa)] | 1.1 | 1.2 | 1.3 | 1.4 | 1.3 | 1.4 | 18 | 22 | 31 | 28 |
|  | Moisture Transmittance [g/(m$^2$ · 24 h)] | 0.12 | 0.14 | 0.13 | 0.16 | 0.18 | 0.17 | 3.7 | 3.8 | 2.1 | 1.5 |

*[1] Surface-modified

As is apparent from the evaluation results of physical properties, as shown in Tables 2-2, it was proved that laminates (fiber composite materials) of Examples 2-17 to 2-22 were superior in mechanical strength and resulted in markedly reduced linear expansion coefficient and enhanced gas barrier capability.

Example 3

Production Example 3-1

A sulfur pulp prepared from needle-leaf trees was added to pure water at a concentration of 0.1% by mass and ground once by using a stone mill type grinder (Pure Fine Mill KMG 1-10, made by Kurita Kikai Seisakusho Co.) at 1500 rpm to obtain an aqueous fibrillated cellulose fiber dispersion. The obtained aqueous cellulose fiber dispersion was filtered, washed with pure water and dried at 70° C. to obtain cellulose fiber A. From scanning electron-microscopic observation, it was confirmed that the obtained cellulose fibers were defibrated to an average fiber diameter of 1 nm for micro-fibrillation.

Production Example 3-2

To 500 parts by mass of an anhydrous butyric acid/pyridine (at a molar ratio of 1/1) was added 10 parts by mass of the micro-fibrillated cellulose fiber obtained in Production Example 2-1 and dispersed with stirring for 3 hrs. at room temperature. The thus dispersed fiber was filtered, washed with 500 parts by mass of water three times and washed with 200 parts by mass of ethanol two times. The fiber was washed with 500 parts by mass of water two times and then dried at 70° C. to obtain surface-modified cellulose fiber B. From scanning electron-microscopic observation of the obtained cellulose fibers, it was confirmed that the average fiber diameter was maintained at 1 nm.

Production Example 3-3

A sulfur pulp prepared from needle-leaf trees was added to pure water at a concentration of 0.1% by mass and ground fifty times by using a stone mill type grinder (Pure Fine Mill KMG 1-10, made by Kurita Kikai Seisakusho Co.) at 1500 rpm to obtain an aqueous fibrillated cellulose fiber dispersion. The obtained aqueous cellulose fiber dispersion was filtered, washed with pure water and dried at 70° C. to obtain cellulose fiber C. From scanning electron-microscopic observation, it was confirmed that the obtained cellulose fibers were defibrated to an average fiber diameter of 4 nm for micro-fibrillation.

Production Example 3-4

To 500 parts by mass of an anhydrous butyric acid/pyridine (at a molar ratio of 1/1) was added 10 parts by mass of the micro-fibrillated cellulose fiber obtained in Production Example 3-3 and dispersed with stirring for 3 hrs. at room temperature. The thus dispersed fiber was filtered, washed with 500 parts by mass of water three times and washed with 200 parts by mass of ethanol two times. The fiber was washed with 500 parts by mass of water two times and then dried at 70° C. to obtain surface-modified cellulose fiber D. From scanning electron-microscopic observation of the obtained cellulose fibers, it was confirmed that the average fiber diameter was maintained at 4 nm.

Production Example 3-5

Cellulose fiber E was obtained similarly to Production Example 3-1, except that grinding treatment to defibrate cellulose fibers was conducted 30 times. From scanning electron-microscopic observation, it was confirmed that the obtained cellulose fibers were defibrated to an average fiber diameter of 40 nm for micro-fibrillation.

Production Example 3-6

To 500 parts by mass of an anhydrous butyric acid/pyridine (at a molar ratio of 1/1) was added 10 parts by mass of the micro-fibrillated cellulose fiber obtained in Production Example 3-5 and dispersed with stirring for 3 hrs. at room temperature. The thus dispersed fiber was filtered, washed with 500 parts by mass of water three times and washed with 200 parts by mass of ethanol two times. The fiber was washed with 500 parts by mass of water two times and then dried at 70° C. to obtain surface-modified cellulose fiber F. From scanning electron-microscopic observation of the obtained cellulose fibers, it was confirmed that the average fiber diameter was maintained at 40 nm.

Production Example 3-7

Cellulose fiber G was obtained similarly to Production Example 3-1, except that grinding treatment to defibrate cellulose fibers was conducted 20 times. From scanning electron-microscopic observation, it was confirmed that the obtained cellulose fibers were defibrated to an average fiber diameter of 90 nm for micro-fibrillation.

Production Example 3-8

To 500 parts by mass of an anhydrous butyric acid/pyridine (at a molar ratio of 1/1) was added 10 parts by mass of the micro-fibrillated cellulose fiber obtained in Production Example 3-7 and dispersed with stirring for 3 hrs. at room temperature. The thus dispersed fiber was filtered, washed with 500 parts by mass of water three times and washed with 200 parts by mass of ethanol two times. The fiber was washed with 500 parts by mass of water two times and then dried at 70° C. to obtain surface-modified cellulose fiber H. From scanning electron-microscopic observation of the obtained cellulose fibers, it was confirmed that the average fiber diameter was maintained at 90 nm.

Production Example 3-9

Cellulose fiber I was obtained similarly to Production Example 3-1, except that grinding treatment to defibrate cellulose fibers was conducted 10 times. From scanning electron-microscopic observation, it was confirmed that the obtained cellulose fibers were defibrated to an average fiber diameter of 200 nm for micro-fibrillation.

Production Example 3-10

To 500 parts by mass of an anhydrous butyric acid/pyridine (at a molar ratio of 1/1) was added 10 parts by mass of the micro-fibrillated cellulose fiber obtained in Production Example 3-9 and dispersed with stirring for 3 hrs. at room temperature. The thus dispersed fiber was filtered, washed with 500 parts by mass of water three times and washed with 200 parts by mass of ethanol two times. The fiber was washed with 500 parts by mass of water two times and then dried at 70° C. to obtain surface-modified cellulose fiber J. From scanning electron-microscopic observation of the obtained cellulose fibers, it was confirmed that the average fiber diameter was maintained at 200 nm.

Production Example 3-11

Cellulose fiber K was obtained similarly to Production Example 3-1, except that grinding treatment to defibrate cellulose fibers was conducted 5 times. From scanning electron-microscopic observation, it was confirmed that the obtained cellulose fibers were defibrated to an average fiber diameter of 210 nm for micro-fibrillation.

Production Example 3-12

To 500 parts by mass of an anhydrous butyric acid/pyridine (at a molar ratio of 1/1) was added 10 parts by mass of the micro-fibrillated cellulose fiber obtained in Production Example 3-11 and dispersed with stirring for 3 hrs. at room temperature. The thus dispersed fiber was filtered, washed with 500 parts by mass of water three times and washed with 200 parts by mass of ethanol two times. The fiber was washed with 500 parts by mass of water two times and then dried at 70° C. to obtain surface-modified cellulose fiber L. From scanning electron-microscopic observation of the obtained cellulose fibers, it was confirmed that the average fiber diameter was maintained at 210 nm.

Preparation of Laminate:

Cellulose composite materials (laminates) of Examples 3-1 to 3-11 were prepared according to the procedure, as follows. Raw materials were blended in the dry state according to the composition shown in Table 3 and dried at 60° C. over 12 hrs. The prepared blend was melt-kneaded under conditions of barrel temperature of 180° C. at an ejection amount of 10 kg/hr using a kneader installed with an extensional-flow chamber, as shown in FIG. 1, at the resin discharge portion, and the resin ejected from the top of the extruder was cut in a pellet form to obtain pelletized fiber composite material. After subjecting the thus obtained pellets to vacuum drying at 70° C. for 24 hrs., test pieces used for measurement of physical properties (140×12×2 mm) were prepared using an injection molding machine (IS-80G type, Toshiba Kikai Co., Ltd.). Evaluation results are shown in Table 3.

Preparation of Comparative Laminate

Cellulose composite materials (laminates) of Comparative Examples 3-1 to 3-4 were prepared in the manner similar to the foregoing Examples 1-11, provided that the composition shown in Table 3 was melt kneaded using a biaxial kneader (TEM35 type, Toshiba Kikai Co., Ltd.) under a barrel temperature of 180° C. and a discharge amount of 10 kg/h. The thus prepared cellulose composite materials were also evaluated with respect to bending elastic modulus, linear expansion coefficient and dispersibility of cellulose fibers, as below. Evaluation results are shown in Table 3.

(1) Bending Elastic Modulus and Bending Strength:

A 140×12×2 mm test piece was prepared and measured with respect to bending elasticity and bending strength at a temperature of 20° C. by using Autograph (DSS-500, made by Shimadzo Co.) at a distance between supporting points of 80 cm and a bending rate of 2 mm/min.

(2) Linear Expansion Coefficient:

The foregoing test piece was also measured with respect to linear expansion coefficient (expressed in ppm) by using EXSTAR6000TMA/SS6100 (made by Seiko Instrument Co.) within the range of 40 to 80° C.

(3) Dispersibility of Cellulose Fiber

A molded material was visually observed and evaluated with respect to homogeneity, based on the presence/absence of fiber aggregates.

TABLE 3

| | | | Example No. | | | | | | | |
|---|---|---|---|---|---|---|---|---|---|---|
| | | | 3-1 | 3-2 | 3-3 | 3-4 | 3-5 | 3-6 | 3-7 | 3-8 |
| Composition (part by mass) | Resin | PE Resin A | 80 | 80 | 80 | 80 | 80 | 80 | 80 | — |
| | | PB Resin B | — | — | — | — | — | — | — | 80 |
| | | PC Resin | — | — | — | — | — | — | — | — |
| | Cellulose Fiber | A (1 µm) | — | — | — | — | — | — | — | — |
| | | C (4 nm) | — | — | — | — | — | 20 | — | — |
| | | E (40 nm) | — | — | — | — | — | — | 20 | — |
| | | B *1 (1 µm) | — | — | — | — | — | — | — | — |
| | | D *1 (4 nm) | 20 | — | — | — | — | — | — | — |
| | | F *1 (40 nm) | — | 20 | — | — | — | — | — | 20 |
| | | H *1 (90 nm) | — | — | 20 | — | — | — | — | — |
| | | J *1 (200 nm) | — | — | — | 20 | — | — | — | — |
| | | L *1 (210 nm) | — | — | — | — | 20 | — | — | — |
| | Stabilizer A | | 0.2 | 0.2 | 0.2 | 0.2 | 0.2 | 0.2 | 0.2 | 0.2 |
| | Stabilizer B | | 0.05 | 0.05 | 0.05 | 0.05 | 0.05 | 0.05 | 0.05 | 0.05 |

TABLE 3-continued

| Physical Property | Bending Elastic Modulus (MPa) | 8500 | 8200 | 8000 | 7800 | 7200 | 7400 | 7200 | 7800 |
|---|---|---|---|---|---|---|---|---|---|
| | Bending Strength (MPa) | 140 | 120 | 112 | 108 | 101 | 105 | 102 | 120 |
| | Linear Expansion Coefficient (ppm) | 9 | 9 | 11 | 13 | 25 | 18 | 21 | 15 |
| | Fiber Dispersibility | Uniform | | | | | | | |

| | | | Example No. | | | Comparative Example No. | | | |
|---|---|---|---|---|---|---|---|---|---|
| | | | 3-9 | 3-10 | 3-11 | 3-1 | 3-2 | 3-3 | 3-4 |
| Composition (part by mass) | Resin | PE Resin A | — | 80 | 80 | 100 | 80 | 80 | 80 |
| | | PB Resin B | — | — | — | — | — | — | — |
| | | PC Resin | 80 | — | — | — | — | — | — |
| | Cellulose Fiber | A (1 μm) | — | — | 20 | — | — | — | — |
| | | C (4 nm) | — | — | — | — | — | — | — |
| | | E (40 nm) | — | — | — | — | — | — | — |
| | | B *1 (1 μm) | — | 20 | — | — | — | — | 20 |
| | | D *1 (4 nm) | — | — | — | — | 20 | — | — |
| | | F *1 (40 nm) | 20 | — | — | — | — | 20 | — |
| | | H *1 (90 nm) | — | — | — | — | — | — | — |
| | | J *1 (200 nm) | — | — | — | — | — | — | — |
| | | L *1 (210 nm) | — | — | — | — | — | — | — |
| | Stabilizer A | | 0.2 | 0.2 | 0.2 | 0.2 | 0.2 | 0.2 | 0.2 |
| | Stabilizer B | | 0.05 | 0.05 | 0.05 | 0.05 | 0.05 | 0.05 | 0.05 |
| Physical Property | Bending Elastic Modulus (MPa) | | 6200 | 7000 | 6700 | 4500 | 5100 | 5000 | 4800 |
| | Bending Strength (MPa) | | 125 | 98 | 90 | 41 | 51 | 48 | 43 |
| | Linear Expansion Coefficient (ppm) | | 15 | 28 | 30 | 62 | 48 | 51 | 57 |
| | Fiber Dispersibility | | Uniform | | | Non-uniform *2 | | | |

*1 Surface-modified,
*2 Aggregates were found

In Table 3, PE Resin A, PE Resin B, PC Resin, Stabilizer A and Stabilizer B are as follows:

PE Resin A: poly(lactic acid) LACEA H-400, Mitsui Kagaku Co.,

PE Resin B: polybutylene adipate/terephthalate (Ecoflex, BASF Japan Ltd.),

PC Resin: YUPIRON S1000 (Mitsubishi Engineering Plastic Co.),

Stabilizer A: tetrakis(1,2,2,6,6-pentamethylpiperidyl)butanetetracaracarboxylate, Stabilizer B: 2,2'-methylenebis(4,6-di-t-butylphenyl)-2-ethylhexyl phosphite.

As is apparent from the evaluation results of Table 3, it was proved that laminates of Examples 3-1 to 3-11, relating to the present invention were superior in mechanical strength and resulted in a markedly reduced linear expansion coefficient.

Further, it was proved that advantageous effects similar to the foregoing were also achieved when an inorganic particulate compound used in Example 1 (e.g., RX200), or an inorganic lamellar compound used in Example 2 (e.g., montmorillonite) was incorporated in the Examples 3-1 to 3-11.

What is claimed is:

1. A laminate comprising:
   a resin substrate, wherein the resin substrate is a polyethylene terephthalate film or a triacetyl cellulose film; and
   a composite layer on the resin substrate,
   wherein the composite layer contains an inorganic compound and a cellulose fiber exhibiting an average fiber diameter of not less than 2 nm and not more than 180 nm,
   the inorganic compound is an inorganic particulate compound, and
   the inorganic particulate compound is silica and has a volume average particle diameter of not less than 1 nm and not more than 1000 nm.

2. The laminate of claim 1, wherein the composite layer further contains a resin and the composite layer comprises a single layer or plural layers, and the cellulose fiber, the inorganic compound and the resin are contained in the single layer or separately in the plural layers.

3. The laminate of claim 2, wherein the cellulose fiber and the resin are contained in the single layer.

4. The laminate of claim 3, wherein the composite layer comprises a coating layer.

5. The laminate of claim 1, wherein the composite layer comprises a coating layer.

6. The laminate of claim 5, wherein the cellulose fiber is a surface-modified cellulose fiber.

7. The laminate of claim 5, wherein the coating layer contains the inorganic particulate compound and the inorganic particulate compound having a volume average particle diameter of not less than 2 nm and not more than 1000 nm.

8. The laminate of claim 1, wherein the fiber exhibits an average fiber length of not less than 50 nm and a ratio of average fiber length to average fiber diameter of not less than 50 and not more than 10,000.

9. The laminate of claim 1, wherein the average fiber diameter of the cellulose fiber is not less than 2 nm and not more than 100 nm.

10. The laminate of claim 9, wherein a ratio of average fiber length to average fiber diameter is not less than 50 and not more than 7000.

11. The laminate of claim 1, wherein the inorganic particulate compound is contained in an amount of 5-70 parts by weight of the cellulose fiber.

* * * * *